United States Patent [19]

Koskela

[11] 4,326,499
[45] Apr. 27, 1982

[54] SOLAR WATER HEATING SYSTEM AND HEAT EXCHANGER THEREFOR

[76] Inventor: Marvin O. Koskela, 4222 E. Calle Redondo, Phoenix, Ariz. 85018

[21] Appl. No.: 106,539

[22] Filed: Dec. 26, 1979

[51] Int. Cl.³ .............................................. F24J 3/02
[52] U.S. Cl. ..................................... 126/420; 126/435
[58] Field of Search ............... 126/419, 420, 422, 437, 126/435, 436; 165/160

[56] References Cited

U.S. PATENT DOCUMENTS

| | | | |
|---|---|---|---|
| 2,127,732 | 8/1938 | Heitman | 165/160 |
| 3,100,523 | 8/1963 | Marrujo | 165/160 |
| 3,986,489 | 10/1976 | Schlesinger | 126/422 |
| 4,027,821 | 6/1977 | Hayes et al. | |
| 4,044,948 | 8/1977 | Bottum et al. | 126/422 |
| 4,232,657 | 11/1980 | Killorin | 126/437 |
| 4,237,862 | 12/1980 | Embree | 126/420 |
| 4,269,167 | 5/1981 | Embree et al. | 126/420 |

OTHER PUBLICATIONS

"Solar Heating Systems Design Manual", ITT Bulletin TESE-576, 1976, pp. 4-8 to 4-13, 4-33, 34, 6-2.

Primary Examiner—Samuel Scott
Assistant Examiner—Lee E. Barrett
Attorney, Agent, or Firm—Victor Myer

[57] ABSTRACT

In a solar water system including a solar collector prevention of damage to the collector during freezing conditions is achieved by providing a relatively small independent heat exchanger between the solar collector and the water heater and a vacuum breaking system whereby the water in the solar collector is drained into the heat exchanger. The heat exchanger is connected to a thermal siphon arrangement with the water heater.

10 Claims, 3 Drawing Figures

SOLAR WATER HEATING SYSTEM AND HEAT EXCHANGER THEREFOR

BACKGROUND OF THE INVENTION

The world has become increasingly aware of the scarcity of fuel including, particularly, the fossil fuels, gas and oil. At the same time the world has become increasingly aware of the energy available from the sun, particularly, in those areas where there is a high percentage of days throughout the year when the sun is available for heating purposes and for other energy available in the sun's spectrum. For these reasons, a great deal of attention has been paid to the utilization of solar energy for heating systems and, particularly, for water heating systems.

In those instances wherein it is desired to use the hot water directly, the time interval between the collection of solar energy and its use in the form of hot water is relatively short. In the instances wherein the energy is intended to be used for space heating, as for example, heating of homes, the heating of hot water through the use of solar energy provides a storage means from which the heat can be later extracted for use in space heating.

Solar heating systems can be designed from the ground up so to speak, but frequently the system consists of applying a solar collector, or solar heating unit, to an already existing hot water tank. Typically, this is the case in home systems. Here the federal government regulations require that the solar heating unit be utilized in connection with an existing hot water heater which has its own heating source whether it be electric, gas or oil. Such systems include the solar collecting unit operating in association with a hot water heater or the solar heating unit operates in connection with a heat exchanger that is connected to the hot water heater. The heat exchanger may be a separate unit or it may be part of a larger water tank system. In any event, the liquid flowing through the solar collector which is usually mounted on a roof of a house, has water flowing through it that is heated in the process of being exposed to the sun's radiation. When the ambient temperature drops below freezing, the water circulating through the solar collector unit is apt to freeze and in so doing may burst the pipes in the solar collector. This would incapacitate the system and render substantial damage. Systems for preventing this are known to the art and usually involve the drainage of the solar collector unit, or the circulation therethrough of warm water from the hot water heater itself. Such known systems tend to be large and bulky, complicated and somewhat ineffective in operation. It goes virtually without saying that the possibility of freezing of a solar water heating system is an intolerable situation.

Accordingly, it is an object of the invention to provide an improved solar hot water heating system eliminating the objections of prior art devices.

It is a further object of the invention to provide a solar heating system of the nature indicated including an improved system for drainage of the circulating liquid through the solar collector unit when the ambient temperature drops below a predetermined value.

It is a further object of the invention to provide an improved heat exchanging unit which is small in size and efficient in operation for use in connection with a solar heating system including a solar collector and a water heater.

SUMMARY OF THE INVENTION

In carrying out the invention according to one form there is provided a solar water heating system comprising a water storage tank including cold water inlet means and hot water outlet means and comprising a water utilization system, a solar collecting unit having cold liquid inlet means and heated liquid outlet means and comprising a heating liquid system, an independent heat exchanger disposed between the water storage system and the heating liquid system, and means associated with the collector unit and the heat exchanger for draining the liquid from the solar collector and into the heat exchanger under certain predetermined temperature conditions. While the drainage mechanism may include a separate venting conduit, according to a preferred form of the invention, the venting conduit may be eliminated and the drainage achieved through appropriate selection of the dimensions of the conduit to and from the solar collector unit. It is a further object of the invention to provide an improved heat exchanger of the character indicated which is simple in construction, efficient in operation and easy to maintain.

It is a further object of the invention to provide an improved independent heat exchanger of the nature indicated which finds usefulness in association with already installed hot water systems.

Further advantages and objects of the invention will become apparent as the description proceeds.

In carrying out the invention according to a further form, there is provided pump means for pumping heating liquid from the independent heat exchanger to the liquid inlet means of the solar collecting unit and from the liquid outlet means of the solar collecting unit to the independent heat exchanger and including differential temperature sensing means for sensing the temperature differential between the heated liquid outlet means of the solar collecting unit and the entry to the independent heat exchanger from the water storage tank and for actuating the pump means upon a first value of the differential temperature and inactivating said pump means upon a second value of differential temperature less than the first value.

DESCRIPTION OF THE PREFERRED EMBODIMENTS

Figure 1:
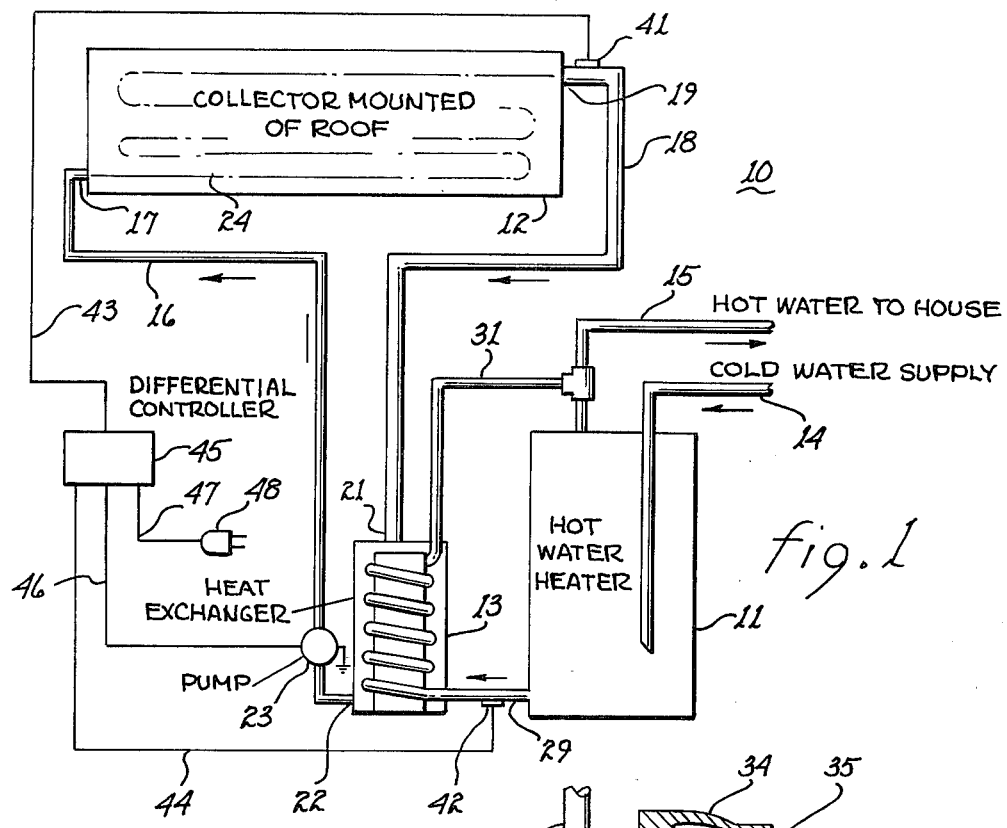
FIG. 1 is a diagramatic view of a solar water heating system according to the invention.

Referring to the drawings, the invention is shown embodied in a system 10 (FIG. 1) which may comprise an ordinary home water heater 11, a solar collector unit 12 and an independent heat exchanger 13 connected together and controlled as will be more particularly described.

The water heater 11 may be of any ordinary well-known variety heated by electricity, gas, oil, or the like, to which cold water is supplied through an appropriate pipe 14 and from which hot water is taken by an appropriate pipe or conduit 15. The solar collector unit 12 may be of any well-known variety such, for example, as the units manufactured by the Colt, Inc. Cold water or other heating liquid is supplied through pipe or conduit 16 to the inlet 17 of the collector unit 12, and the heated water or other liquid is taken from the solar collector unit 12 through a pipe or conduit 18 at the heated liquid outlet 19, and is supplied to the inlet 21 of the separate, or independent, heat exchanger 13. Cooled heating liquid from the heat exchanger 13 flows out at outlet 22, and by means of the electrically operated pump 23 is supplied through pipe or conduit 16 to the input 17 of the solar collector unit. Circulation of heating fluid, which may be water, usually, takes place through suitable passages in the collector 12, these being shown diagramatically by the dotted lines 24.

Figure 2:
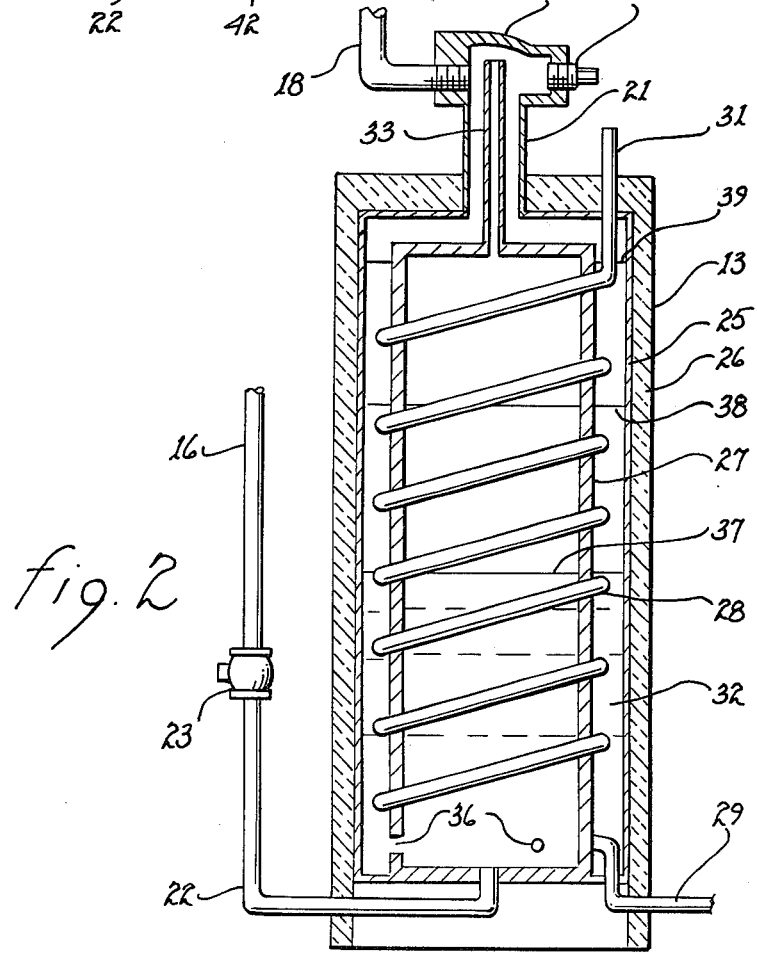
FIG. 2 is a sectional view on an enlarged scale of the heat exchanger unit forming part of the invention.

Referring more particularly to FIG. 2, the heat exchanger 13 is shown as comprising an outer tank 25 insulated in any usual manner as by a layer of fiber glass insulation 26, an inner tank 27 suitably supported inside of the outer tank and a heat transfer coil 28 surrounding the inner tank 27 and having an inlet 29 and an outlet 31. The heat exchanger coil 28 may be, conveniently, in the form of a spiral and occupies a portion of the space 32 between the inner tank 27 and the outer tank 25. The inlet 29 of the spiral heat exchanger coil 28 communicates with the lower end of the hot water heater tank 11 as may be seen in FIG. 1, and the upper or outlet end of the spiral heating coil 31 is in communication with the conduit 15 which supplies hot water to the user from the hot water tank 11. The spiral heat exchanger coil 28 cooperates with the hot water tank 11 in the form of a thermal siphon in that when the water in the heat exchanger coil is heated it induces a circulation with the water inside of the hot water tank because heated water rises and the entry end 29 is at the lower end of the heat exchanger coil 28 and the lower end of the hot water heater 11.

The lower end of the inner tank 27 communicates with the outlet conduit 22 and at the upper end of the inner tank 27 there is a small pipe or conduit 33 extending through the inlet conduit 21 and terminating near the upper portion of the connecting fitting 34 as shown in FIG. 2. The fitting 34 communicates with the pipe or conduit 18 also connected to the outlet end of the solar collector 12. The fitting 34 may include an inspection, or cleaning, plug 35.

At the lower end of the inner tank 27 there are a series of openings 36 of which there may be, in the typical case, three disposed around the circumference of the tank.

During operation, heated water from the solar collector flows downwardly through conduit 18 and through the inlet 21 into the space 32 between the inner tank 27 and the outer tank 25. In so doing, the heated water comes into contact with the turns of the heater exchanger coil 28 causing the water therein to become heated and circulate into the hot water tank as already described. The heated water from the solar collector 12 and coming down through conduit 18 does not flow into the conduit 33 because the upper end thereof is disposed above the entrance of conduit 18 into the fixture 34 also as already described. The heat transfer fluid filling up the space 32 between the inner and outer tanks, however, flows through the openings 36 and into the interior of the inner tank 27. The heat transfer fluid, water for example, flows out of the inner tank 27 through the conduit 22. The pump 23 circulates the heating liquid from conduit 22 (the interior of inner tank 27) and through the conduit 16 to the solar collector inlet 17 as already described. The total area of the openings 36 is slightly larger than the inside diameter of the conduit 22 so that when the system is functioning and the pump 23 is operating, the liquid in the space 32 flowing through the openings 36 is adequate to supply the requirements of the pump 23. In this process the liquid inside of the inner tank 27 rises to a level shown approximately by the line 37.

When the system stops functioning, as for example when the temperature drops at night and in order to prevent freezing of the heating liquid (water) in the solar collector 12, the heating liquid in the solar collector drains back through conduit 16 and thus through pump 23 and conduit 22 into the interior of the tank 27. The liquid level under this condition rises about to that shown by the line 38. The space inside of the inner tank 27 is sufficiently large so that all of the heating liquid in the solar collector 17 can drain back into the interior of tank 27 and the space 32 between tank 27 and tank 25 so that no heating liquid (water) is in the solar collector and thus all danger of difficulty by freezing of the heating liquid is removed.

The drain back process under the conditions described does not give rise to the creation of a vacuum in the system which could prevent the drain out of the solar collector because the conduit 18 is made of somewhat greater inner diameter than that of the conduit 16. In this manner an air or other gaseous pathway is provided from the interior of the heat exchanger 13 to the solar collector. In a typical case the inside diameter of conduit 16 might be one-half inch and the inside diameter of conduit 18 might be three-quarters of an inch. Referring specifically to FIG. 2, it will be noted that the inside of the inner tank 27 which contains a gaseous medium such, for example, as air, communicates through conduit 33 with the upper portion of fixture 34. This provides communication between the interior of tank 27 and through conduit 33 and through the conduit 18 of increased diameter as compared with conduit 16 to the interior of the solar collector 12. Thus, there is an air pathway from the interior of tank 27 to the solar collector and no vacuum will form to prevent the drain back of liquid into the heat exchanger.

When the system is functioning and hot water is flowing downwardly through conduit 18 from the solar collector, the liquid level in the space 32 between the inner tank 27 and the outer tank 25 rises to the level shown approximately by the line 39. The level 39 is selected so that the hot water surrounds essentially all of the turns of the heat exchanger coil 28 and thus provides for maximum heating effect to the hot water tank 11. Other liquid levels may be chosen. The liquid level during operation can rise to the level 39 in the space 32 while the level inside of the tank 27 remains at the level 37 because the inside diameter of the conduit 22 may be slightly less than the total area of the openings 36. Thus, liquid can be pumped out through conduit 22 at a somewhat lesser rate as compared with what will flow into the interior of tank 27 through openings 36.

To turn the system on and off during appropriate temperature conditions, temperature sensors 41 and 42 are attached or associated, respectively, with the outlet 19 of the solar collector 12 and the cold water outlet 29 from the hot water heater 11. The temperature sensors 41 and 42 are connected, respectively, by means of conductors 43 and 44 to a differential controller 45, shown schematically, from which a conductor 46 extends to the motor of pump 23. The differential controller is connected by a conductor 47 to an ordinary wall plug 48 which may be plugged into a common ordinary house lighting circuit. The temperature sensors 41, 42, the differential controller 45 and the circuits connected thereto are standard available items from several sources and any may be utilized. One form is available from a company known as Heliotrope General and the components are sold under the name of "Delta T".

For ordinary operating conditions, when the temperature at sensor 41 reaches a level of about 15 degrees higher than the temperature at sensor 42, the pump 23 is caused to turn on. This causes heated water from the solar collector 12 to circulate through the system as described, thereby resulting in water in the hot water heater 11 being heated. During conditions of no sunlight such as at night or on cold overcast days or at any time when the weather is cold such that freezing of the water in the solar collector might take place, the temperature at sensor 41 reaching a level of only five degrees or so above the temperature level of sensor 42, the pump 23 is caused to turn off. Under this condition the water or heating fluid in the solar collector 12 drains back through conduit 16 by virtue of the mechanism and structure as already described. Thus, the solar collector becomes empty of heating water and no freezing can take place. Of course the water in the conduits 18 and 16 likewise drains down into the interior of the heat exchanger 13.

The heat exchanger 13 is of relatively small size and thus may be accommodated in the ordinary home water heating system without requiring the water heater itself to be replaced. Typically, the heat exchanger 13 may have a diameter of about ten inches and a height of about thirty-four inches excluding the thickness of the insulation surrounding it. Obviously, in the effort to conserve energy one or more inches of insulation would be provided around the exterior of the heat exchanger 13.

Figure 3:
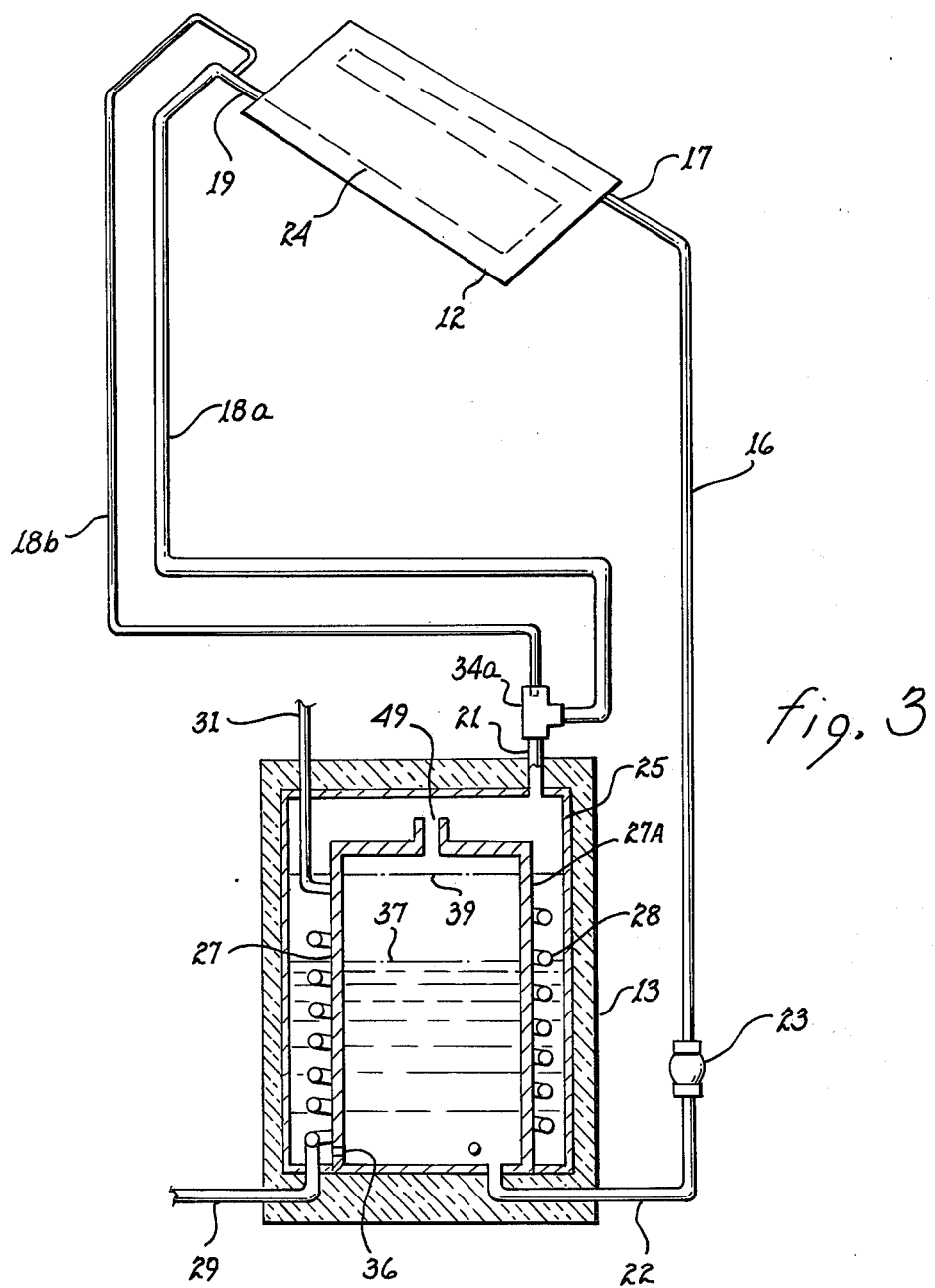
FIG. 3 is a schematic drawing of a modified form of the invention.

Other ways of breaking any vacuum that might exist in the lines during drain back of the water from the solar collector 12 may be used. Similarly, variations may be made in the heat exchanger 13. One form of modified structure is shown in FIG. 3 and will now be described. In FIG. 3 wherein the parts are essentially identical to those shown in FIGS. 1 and 2 the same reference characters will be used. Thus, in FIG. 3 there is shown a solar collector 12 and a heat exchanger 13.

The essential difference between the structures as illustrated in FIG. 3 and FIG. 1 is that a vacuum breaking conduit or pipe 18b is provided between the inlet of the heat exchanger 13 and the outlet 19 of solar collector 12. The conduit from the outlet 19 of the solar collector 12 namely, conduit 18a extending to the inlet of the heat exchanger 13 may be of the same diameter as the conduit 16 which supplies liquid to the solar collector 12 from pump 23. In this instance the diameter of conduit 18a may be of the same size as that of conduit 16. Not shown in FIG. 3 is the temperature sensing mechanism of FIG. 1, but it would be, in all respects, the same with the temperature sensors located at the corresponding points.

In the version shown in FIG. 3 when the system is functioning to provide heating water to the heat exchanger 13 the liquid level stands at the level shown by the line 37 and when the system has drained itself through the mechanism described, the level will stand at that shown by the line 39. To complete the air pathway so that any vacuum may be broken during the drain back, the inner tank 27 of FIG. 3 may be provided with a vent or opening 49 which communicates with the air space above the liquid level in the tank 25 and, thus, through the inlet 21 and fitting 34a to pipe or conduit 18b. Since there is an air supply available through pipe 18b to the outlet 19 of solar collector 12 there will be no vacuum formation therein and during the appropriate conditions, as described, the water in the solar collecter 12 and in the conduits 16 and 18a will drain back into the heat exchanger 13.

In either system, for the thermal syphon effect to function best, the heat exchanger 13 should be disposed at about the lower level of hot water heater 11. The cold water outlet from heater 11 to cold water inlet to heat exchanger 13, namely 29, conveniently are about at the same level. The principle that hot water rises should be taken advantage of in the thermal syphon effect between the hot water heater 11 and the heat exchanger 13.

While two forms of the invention have been shown it will be apparent that other forms may be made coming within the spirit and scope of the inventive concept.

What is claimed is:

1. A solar water heating system comprising a water storage tank including cold water inlet means and heated water outlet means and comprising a water utilization system, a solar collecting unit having cold liquid inlet means and heated liquid outlet means and comprising a heating liquid system, an independent heat exchanger disposed between said water utilization system and said heating liquid system, and means associated with said collector unit and said heat exchanger for draining the liquid from said solar collector and into said heat exchanger under certain predetermined temperature conditions, said independent heat exchanger comprises an outer tank having first inlet means of a predetermined size to accommodate a vent pipe and liquid flow for receiving heated liquid from said solar collecting unit and first outlet means for transferring cooled liquid to said solar collecting unit, a series of heat exchanger coils inside of said outer tank and having second inlet and second outlet means connected, respectively, to the cold water portion and the hot water portion of said water storage tank, said second outlet means of said heat exchanger being adjacent the first inlet means of said outer tank, and a closed tank disposed interiorly of said series of heat exchanger coils and having a third outlet connected to said first outlet means, said inner tank having a volume sufficient to provide an air space in addition to the volume of liquid from the solar collection unit and having at least one opening therethrough communicating with the space between the inner and outer tanks adjacent said third outlet, and a gas vent pipe extending from the interior of said second tank through said first inlet means.

2. The solar water heating system according to claim 1 including pump means for pumping heating liquid from the first outlet of said independent heat exchanger to the liquid inlet means of said solar collecting unit and from the liquid outlet means of said solar collecting unit to the first inlet means of said independent heat exchanger and including differential temperature sensing means for sensing the temperature differential between the heated liquid outlet means of said solar collecting unit and the entry to said independent heat exchanger from said water storage tank and for actuating said pump means upon one value of differential temperature and inactivating said pump means upon a second value of differential temperature less than said one value.

3. The solar water heating system according to claim 1 including a cooled liquid conduit means extending from said first outlet means to the fluid inlet means of said solar collecting unit and a heated liquid conduit means extending from the heated liquid outlet means of said solar collecting unit to said first inlet means, and said liquid draining means comprising an increased diameter of said heated liquid conduit means as compared with said cooled liquid conduit means.

4. The solar water heating system according to claim 3 wherein said heated liquid conduit means comprises a single conduit and said cooled liquid conduit means comprises a single conduit.

5. The solar water heating system according to claim 3 wherein said increased diameter of heated liquid conduit means comprises a liquid conduit of the same diameter as said cooled liquid conduit means and a gas vent conduit extending from the heated liquid outlet means of said solar collecting unit to said first inlet means.

6. The solar water heating system of claim 1 wherein said liquid draining means comprises a gas vent extending between the inlet of said heat exchanger and the outlet of said solar collecting unit.

7. The solar water heating system according to claim 1 wherein said series of heat exchanger coils comprises a spiral coil.

8. The solar water heating system according to claim 1 wherein said at least one opening communicating with the space between the inner and outer tanks comprises a series of three equidistantly spaced holes.

9. The solar water heating system according to claim 1 wherein the space between said inner tank and said outer tank relatively closely conforms to the dimensions of the heat exchanger coils therein for providing close contact of said heat exchanger coils with the heated liquid through said first inlet means.

10. The solar water heating system according to claim 1 wherein the volume inside of said inner tank provides a space greater than the volume of liquid circulating through said solar collecting unit and a gas for venting the solar collecting unit.

* * * * *